Nov. 3, 1925.  1,559,793
A. SEGUIN
APPARATUS FOR THE MEASUREMENT OF SPEEDS
Filed Dec. 1, 1921  3 Sheets-Sheet 1
Fig.1
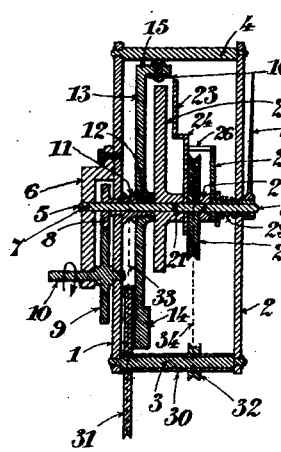
Fig.2
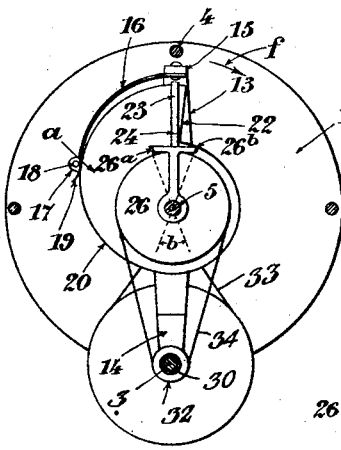
Fig.3
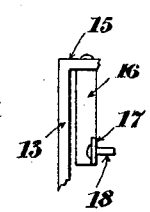
Fig.4
Fig.5
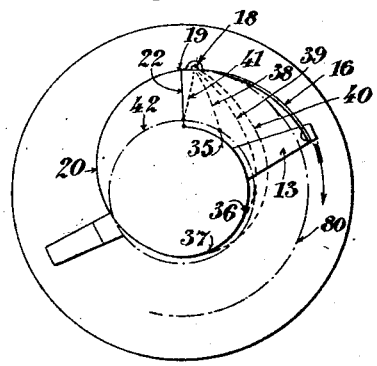
Fig.7
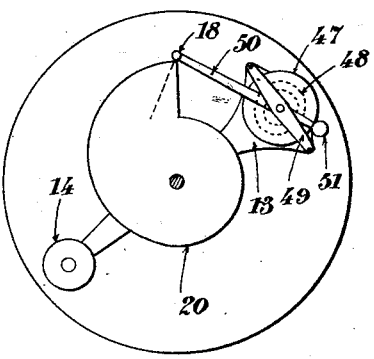
Fig.6   Fig.7a   Fig.8   Fig.9   Fig.10
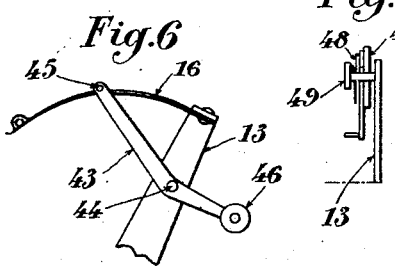
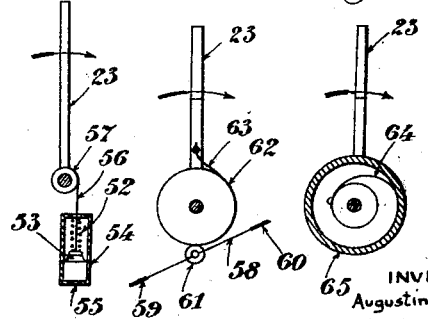
INVENTOR.
Augustin Seguin
By Otto Munn
his ATTORNEY.

Nov. 3, 1925.
A. SEGUIN
1,559,793
APPARATUS FOR THE MEASUREMENT OF SPEEDS
Filed Dec. 1, 1921   3 Sheets-Sheet 2
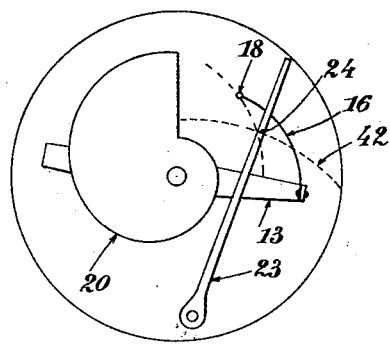
Fig.11
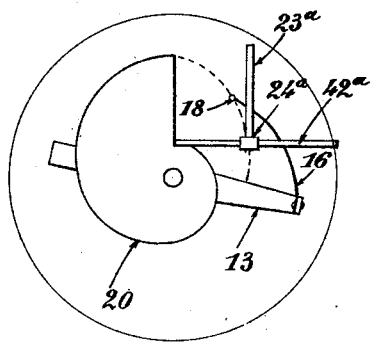
Fig.12
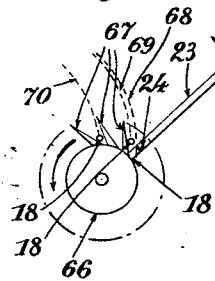
Fig.13
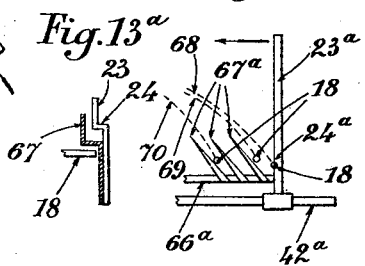
Fig.13ᵃ   Fig.14
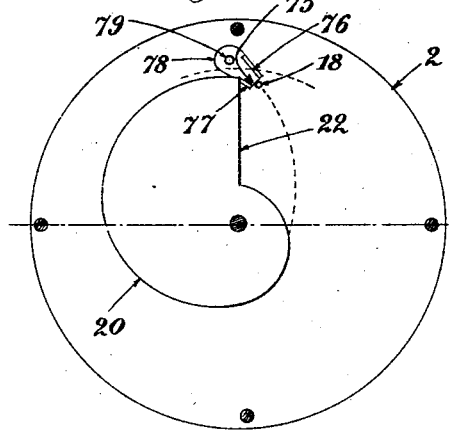
Fig.16.
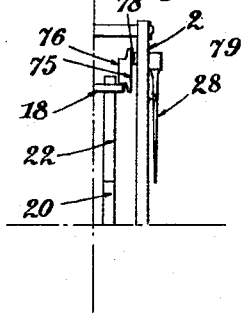
Fig.17
INVENTOR
Augustin Seguin
By Otto Munk
his ATTORNEY.

Nov. 3, 1925.  
A. SEGUIN  
1,559,793  
APPARATUS FOR THE MEASUREMENT OF SPEEDS  
Filed Dec. 1, 1921 3 Sheets-Sheet 3
Fig.15
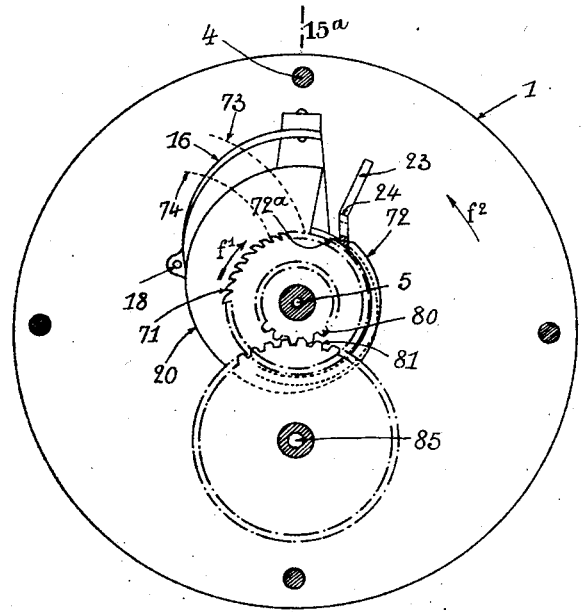
Fig.15ᵃ
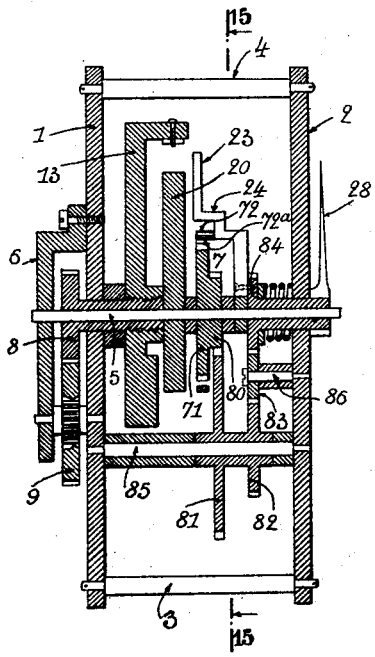
Augustin Seguin  
INVENTOR  
By  
his ATTORNEY Patented Nov. 3, 1925.

1,559,793

UNITED STATES PATENT OFFICE.

AUGUSTIN SEGUIN, OF PARIS, FRANCE.

APPARATUS FOR THE MEASUREMENT OF SPEEDS.

Application filed December 1, 1921. Serial No. 519,071.

*To all whom it may concern:*

Be it known that I, AUGUSTIN SEGUIN, citizen of the French Republic, residing at Paris, in the Republic of France, have invented new and useful Improvements in Apparatus for the Measurement of Speeds, of which the following is a specification.

The present invention has for its object an apparatus for the measurement of speeds, of the type wherein a movement of comparison is used whose speed is not proportional to the speed to be measured.

This invention is essentially characterized that in this apparatus a member A carried by a driven member B has a movement of comparison with reference to said member B, the latter having a speed constantly proportional to the speed to be measured, so that the member A has a resulting speed which is the geometrical resultant of its relative speed with reference to the member B and of the speed proper of the member B. In like manner the member A will follow a path which is that of the motion resulting from the movement of comparison of A with reference to B and of the driving movement of B.

The desired indication of the speed to be measured is thus defined:

1. Either by the position of the meeting point of the path of the member A with a determined curved or straight line.

2. Or by the direction of the movement of said member A at a determined point.

In the accompanying drawing and by way of example,

Fig. 1 is an axial section of an apparatus according to the invention, the indication of the speed to be measured being given by the meeting point of the comparison member A with a curved line.

Fig. 2 is a front view, the front plate being removed.

Figs. 3 and 4 are detail views of different parts of the apparatus.

Fig. 5 is a diagram explaining the operation of the apparatus.

Figs. 6 to 14 show various modifications of detail parts of the apparatus.

Fig. 15 is a section on the line 15—15 (Fig. 15ª) showing a further modified apparatus and Fig. 15ª is a section on the line 15ª—15ª (Fig. 15).

Fig. 16 is a plan view of an apparatus according to the invention, the indication of the speed to be measured being given by the direction of the speed of the member A at a fixed point.

Fig. 17 is a sectional view of the same.

In Figs. 1 to 5, 1 and 2 are the rear and front plates respectively of the casing of the speed indicator, and are connected by the cross pieces 3 and 4. Said casing may be secured on a support in a suitable position by any means whatever; if used on a motor car, the casing may be secured on the dash board, in front of the driver. A shaft 5 extends through the plates and is secured to a bridge 6 by means of a pin 7, this bridge 6 is mounted in fixed position on the plate 1, and the shaft 5 is thus non-rotatable. A pinion 8 is rotatably mounted on said shaft and engages a pinion 9 secured to a shaft 10 which is connected with the engine or car whose speed is to be measured. The hub of said pinion 8 extends through the plate 1 and is made integral with a pulley 11 and a screw-threaded part 12. On this screwthreaded part is screwed an arm 13 provided at one end with a counter-weight 14 and at the other end with a cross part 15 having riveted thereto a spring strip 16 the other end of which is bent as shown at 17; a stud 18 which in Fig. 2 is perpendicular to the plane of the figure, is secured to said bent portion 17 as shown in Fig. 3.

The elasticity of the spring 16 tends to move the stud 18 in the direction of the arrow $a$, and this return movement of the spring after it has been tensioned as hereinafter described, constitutes the relative movement. The stud 18 is the comparison member, whilst the driving member is constituted by the arm 13 which is rotated by means of the pinions 8 and 9 and the shaft 10, at a speed proportional to that which is to be measured. The end 19 of the spring 16 slides on a cam 20 having an involute shape with a radial part 22, said cam being mounted on the shaft 5 and rendered nonrotatable thereon by means of the pin 21. On the shaft 5 and revoluble thereon is mounted the driving pointer 23 having a bent portion 24 and secured to a pulley 25 also revoluble on the shaft 5. A fork 26 is mounted loose on the shaft 5, and is provided with a cylindrical extension passing through the plate 2 in a suitable bearing and having one end secured to the indicating pointer 28 indicating the speed to be measured on a graduated dial carried by the plate 2. This fork 26 has the shape of a T (Fig. 4) with the two ends of the transverse branch of the T bent at right angles and forming two arms 26$^a$ and 26$^b$ which extend laterally of the driving pointer 23 which may thus rotate only through a determined angle $b$ before it strikes 26$^a$ or 26$^b$. The driving pointer 23 is kept apart from the fork 26 by means of the ring 27 rigidly secured by a pin to the shaft 5, in order to prevent the fork 26 being actuated by friction by the driving pointer 23. The fork 26 is subject to sufficient friction by a coiled spring 29 to hold said fork practically stationary in every position into which it is moved. On the cross-piece 3 is mounted a sleeve 30 loosely revoluble thereon and secured to two pulleys 31 and 32 connected with the pulleys 11 and 25 respectively by the respective belts 33 and 34 one of which is crossed.

*Operation.*—On rotating the shaft 10 in the sense of the arrow with a speed proportional to that which is to be measured, the arm 13 will drive the spring 16 in the sense of the arrow $f$ about the fixed cam 20 at a speed proportional to that which is to be measured, and this spring will be tensioned progressively as it bears upon the outer edge of the involute cam, until the end 19 of this spring comes opposite the radial part 22, as shown in Fig. 5. The arm 13 continuing to rotate, the spring 16 will then move freely until it again meets the cam at a point such as 35, 36 or 37, according to the speed of the arm 13. The stud 18 follows a path such as 38, 39 or 40 which is that of the movement resulting from the relative movement of the spring 16 having the path 41 with reference to the arm 13 and from the driven movement of said spring 16 by the circular motion of the arm 13 at a constant speed proportional to the speed to be measured, the path approaching the circle 80 when the speed to be measured increases. The stud 18 following one of these paths, will meet the upper advanced part of the pointer 23 and will drive this pointer thus causing the pulley 25 to slip in its belt, the latter being already driven in the contrary sense by the transmission device 32, 31, 11 until said stub 18 passes under the right angled part 24; the pointer 23 will now no longer be driven by the stud 18 and will take a position determined by the position of the bent portion 24 of the pointer 23 at the point of intersection of the path of the stud 18 with the circle 42 followed by the bent portion 24 during the rotation of the pointer 23. This position will therefore be a function of the speed to be measured. But as soon as the driving action of the stud 18 has ceased during which the pulley 25 is caused to slip in its belt, the pointer 23 is moved rearwardly by the pulleys 11, 31, 32 and this movement will continue until the stud 18 again drives the pointer 23. If the speed to be measured is constant, the pointer 23 will be impelled forward by the stud 18 until this stud again passes under the bent portion 24, bringing back the pointer 23 to the same position as it previously occupied, and the pointer 23 will thus swing through an angle O between two determined positions. If the speed to be measured increases or decreases, the extreme positions of the oscillation of the pointer 23 will change, but when this speed again becomes constant, the two extreme positions of the pointer 23 will again become fixed and well determined, and now the new angle of swing will again become constant and equal to the same angle O. It will thus be noted that if the arms 26$^a$ and 26$^b$ are so construced that the angle $b$ is equal to the angle O, when at constant speed the pointer 23 will swing only between these two arms 26$^a$ and 26$^b$, the pointer 26 as well as the indicating pointer 28 will remain stationary, but if the speed increases or decreases, the fork 26 and the indicating pointer 28 will be impelled forward or backward to a new position of equilibrium indicating the value of the new speed. It is possible even to give to the angle $b$ a value greater than O, and in this case the pointer 28 will be moved by the fork 26 only when the variation of speed reaches a value depending upon the respective values of the angles $b$ and O. In apparatus wherein the speed of rotation of the arm 13 is great, the action of centrifugal force on the spring 16 will tend to slow down the return movement of the same:

If the speed of the arm 13 becomes sufficiently high, this action of centrifugal force might become troublesome and might even be equal to or greater than the expansive force of the spring 16. It is possible in this case to counterbalance this action of centrifugal force by a compensator of any kind, for instance the one shown (Fig. 6), constituted by a lever 43 pivoted at 44 on the arm 13 and bearing by a stud 45 perpendicular to the plane of the figure upon the spring 16 and having at the other end a mass 46 properly designed to counterbalance the action of centrifugal force on the spring 16.

It is obvious that the use of the spring strip 16 giving to the stud 18 its relative movement with reference to the arm 13 is only shown here by way of example, and that any other means may be used which transmits to the stud 18 a speed which is not proportional to that which is to be measured. In particular, there may be used (Figs. 7 and 7$^a$) a balance wheel 47 provided with a spiral spring 48, the whole of the balance wheel and its spiral spring being mounted on the arm 13, the balance wheel having its axis perpendicular to this arm bearing at one end in this arm and at the other end in a bridge piece 49. An arm 50 balanced by a weight 51 and carrying the stud 18 at one end thereof is mounted in a fixed position on the shaft of the balance wheel, so that the return movement of the balance-wheel shall drive this stud 18 in a movement relative to the arm 13 having a circular path, similar to the movement given to this stud 18 by the expansion of the spring 16. The balance wheel 47 may also be mounted with easy friction on its shaft in order to obtain the slipping of this balance wheel on its shaft at the moment of its sudden stop when the stud 18 meets the cam 20, thus damping the shocks, noise and rebounding effects.

In like manner, the back motion of the pointer 23 may be obtained by any suitable means, for instance by gear wheels instead of the pulleys 11, 31, 32, 25 and the belts 33 and 34. Since in this case it will be no longer possible to take advantage of the slip of the belts on the pulleys, it is required to mount the pointer frictionally upon the pinion actuating the pointer. This pointer may be rotated against the action of pin 18 by means of a spring. This may be done as in Fig. 8 by a spring 52 acting on a dash-pot formed by a pressed leather member 53 forming a piston within the cylinder 54 having a small aperture 55 and acting on the pointer 23 through a wire 56 wound on a pulley 57 secured to this pointer, so that the pointer will return in the direction of the arrow with a slow and braked movement and may be freely operated in the contrary direction by the stud 18. Or, to obtain the same result, a spiral spring (Fig. 9) may be used which actuates directly to bring the pointer back, the pointer being braked by an air vane constituted by an arm 58 provided with two vanes 59, 60 perpendicular to the plane of the figure, said arm 58 being secured to a pinion 61 intermeshing with a pinion 62, actuated by the pointer 23 by means of a spring pawl 63 only when this pointer moves back in the direction of the arrow under the action of the spiral spring. This pointer 23 may also be braked in this back motion by a spring 64 (Fig. 10) of spiral form, secured thereto and acting by friction contact within a stationary drum 65, braking the movement of this pointer in the direction of the arrow and leaving it free in the opposite direction.

It should be noted that in these different systems since the tension of the spring which brings back the pointer 23 increases with the speed to be measured, the angle of swing O of this pointer will continue to remain practically constant. It is also possible to obtain the back return of the pointer 23 directly by the action of the stud 18.

To effect this, the pointer 23 is secured (Fig. 13) to a wheel 66 having teeth 67 partially shown in the figure. These teeth 67 (Fig. 13$^a$) are bent at right angles to allow the stud 18 to pass under the same, but are so inclined that if the path of stud 18 corresponding to the position of the pointer 23 shown in the fig., i. e. path 68, becomes shortened due to a reduction of this speed as shown at 69 or 70, for instance, the reaction of the impact of the stud 18 on a tooth 67 will bring back the pointer 23 in the direction of the arrow, until the stud may pass under the bent portion 24 which will finally reach the new position corresponding to the new speed.

Figs. 15 and 15$^a$ show a modification in which the back motion of the pointer 23 is also effected by the action of pin 18. In this device, a ratchet wheel 71 is revolubly mounted with slight friction on the shaft 5 so that the teeth of said wheel may be caught by the pin 18, and the pointer 23 carries a circular shield plate 72 covering a part of the periphery of the wheel 71 and provided at one end with a sharp edge 72$^a$. A pinion 80 secured to, or integral with, the ratchet wheel 71, is adapted to engage a pinion 81 revolubly mounted on a spindle 85 supported by the side plates 1 and 2 of the body of the apparatus. The pinion 81 is secured to or integral with a pinion 82 engaging a pinion 83 carried by a pin 86 secured to the side plate 2. The pinion 83 engages in turn a pinion 84 secured to the pointer 23 and coaxial with the latter and it will be seen that in these conditions if the ratchet wheel is caused to rotate in the direction of the arrow $f^1$ (Fig. 15) the pointer 23 is rotated in the direction of the arrow $f^2$ through the medium of gearing 80—81—82—83 and 84. The operation of this device is as follows: When the pin strikes the pointer 23, the latter is moved in the contrary direction to the arrow $f^2$ and the stud 18 drops below the cross portion 24 and falls upon the sharp edge 72$^a$ of the shield plate 72. The stud 18 then slides upon the upper face of the shield plate 72 until the spring strip 16 is again set by contact with the cam 20. The speed to be measured being assumed constant, the path of the stud 18 is constant and shown at 73. But if the speed decreases the path of the stud 18 is changed and becomes for instance 74, so that the stud 18 drops upon the wheel 71, and since the stud is rotated together with the arm, it drives the wheel 71 in the direction of the arrow $f^1$; but by this motion of the wheel 71, the pointer 23 is rotated in the direction of the arrow $f^2$ together with the shield plate 72, until the sharp edge 72$^a$, advancing towards the stud 18, meets the latter, whereupon the stud leaves the teeth of the wheel 71 and again slides upon the shield plate 72. The pointer 23 being no more moved by the wheel 71 remains stationary in the position corresponding to the reduced new speed. It is to be noted that in these last apparatus the pointer 23 not being constantly moved backwards will no longer oscillate through an angle O and can thus be directly connected with the indicating pointer 28 without the intermediary of the fork 26. It should also be remarked that the axes of rotation of the pointer 23 and the arm 13 need not coincide as shown in Fig. 11. The pointer 23 can also have a movement of translation along a straight line for instance 42$^a$ (Fig. 12) which will then replace the curved line 42. In this case the pointer 23 may be brought back by a device (Fig. 14) similar to the one described with reference to Fig. 13; the toothed wheel 66 is replaced by a rack 66$^a$ with teeth 67$^a$ secured to the pointer 23 which may have a movement of translation along the straight rod 42$^a$.

Figs. 16 and 17 show a modified construction according to the invention, the indication of the speed to be measured being given by the direction of the motion of the comparison member at a determined point on its trajectory. The stud 18 after having left the radial part 22 of the cam 20 engages a path 75, this path being formed by the two upturned edges 76 and 77 of a disc 78 which in turn carries a shaft 79 adapted to pivot in a bearing formed in the plate 2. This shaft extends through the plate and carries on its other end the indicating pointer 28. The path 75 is arranged in close proximity to the point where the stud 18 leaves the involute cam, as shown in the drawing, its entrance is such that the stud 18 will always engage therein irrespectively of its trajectory. It is thus observed that the direction of this path 75 rotating about 79 will depend on the direction of the trajectory of the stud 18 on leaving the path 75, that is, the direction of its motion at that point. As on the other hand the direction of the motion of the stud 18 at this point is a function, as stated, of the speed to be measured, the different directions of this path 75 rotating about 79, indicated by the indicating pointer 28, serve to measure the speed.

Having now described my invention, what I claim as new and desire to secure by Letters Patent is:

1. An apparatus for the measurement of speeds comprising a driving member, means for imparting to said driving member a speed constantly proportional with the speed to be measured, a comparison member mounted on said driving member and constantly rotating with the latter, means for imparting to said comparison member a relative speed with respect to the driving member, indicating means adapted to be intermittently controlled by said comparison member in the direction of the increasing speeds, and means tending to move said indicating means in the opposite direction.

2. An apparatus for the measurement of speeds comprising a driving member formed by a rotatable arm, means for imparting to said arm a speed which is constantly proportional with the speed to be measured, a comparison member including a spring carried by the said driving arm, a stud on said comparison member, a stationary cam adapted to act upon said stud, indicating means adapted to be intermittently controlled by said stud in the direction of the increasing speeds and means tending to move said indicating means in the opposite direction.

3. An apparatus for the measurement of speeds comprising a driving member formed by a rotatable arm, means for imparting to said arm a speed which is constantly proportional with the speed to be measured, a comparison member including a spring carried by the said driving arm, a stud on said comparison member, a stationary cam adapted to act upon said stud, an intermediate member formed by a pointer adapted to come into engagement with the stud, means for imparting to said intermediate member a movement in a direction opposite to that of the driving member and an indicating pointer adapted to be controlled by the intermediate member.

4. An apparatus for the measurement of speeds comprising a driving member formed by a rotatable arm, means for imparting to said arm a speed which is constantly proportional with the speed to be measured, a comparison member including a spring carried by the said driving arm, a stud on said comparison member, a stationary cam adapted to act upon said stud, an intermediate member formed by a pointer adapted to come into engagement with the stud, means which constantly tend to impart to said intermediate member a movement in a direction opposite to that of the driving member, an indicating pointer adapted to be controlled by the intermediate member and means for operatively connecting the intermediate member to the indicating pointer, said means being so constructed as to permit a relative angular movement between the intermediate member and the indicating pointer.

5. An apparatus for the measurement of speeds comprising a driving member formed by a rotatable arm, a counterweight on said arm, means for imparting to said arm a speed which is constantly proportional with the speed to be measured, a comparison member embodying a spring and carried by the said driving arm, a stud on said comparison member, a stationary cam adapted to act upon said stud, means for balancing the effects of centrifugal force upon the said comparison member and indicating means controlled by said stud.

6. An apparatus for the measurement of speed embodying a driven member, means for driving the driven member at a speed proportional to the speed to be measured, a comparison member, means for resiliently mounting the comparison member on the driven member and whereby the latter drives constantly the comparison member, and means for flexing the resilient mounting of the comparison member when the driven member is actuated and for periodically releasing said comparison member for movement under the impulse of its resilient mounting.

7. An apparatus for the measurement of speed embodying a driven member mounted for rotation at a speed proportional to the speed to be measured, a comparison member, a spring secured to the comparison member and carried by the driven member, and a cam adapted to be traversed by the comparison member when the driven member is rotated and shaped to periodically tension said spring and thereupon release the comparison member for movement under the impulse of the spring.

8. An apparatus for the measurement of speed embodying a stationary involute cam, a comparison member adapted to be driven about said cam and to traverse the surface thereof at a speed proportional to the speed to be measured, means for normally resiliently maintaining said member in engagement with the surface of said cam, said member being adapted to jump from the high point of the cam to a lower point thereof, an indicating pointer, an intermediate member, means for normally moving the intermediate member in one direction and into the path of the trajectory of the comparison member which serves to impel the setting member in the opposite direction, and a loose connection between the indicating pointer and the setting member to permit a relative determined angular movement between the same.

In testimony whereof I have signed my name to this specification.

AUGUSTIN SEGUIN.